United States Patent [19]
Gillies

[11] Patent Number: 5,768,595
[45] Date of Patent: Jun. 16, 1998

[54] SYSTEM AND METHOD FOR RECOMPILING COMPUTER PROGRAMS FOR ENHANCED OPTIMIZATION

[75] Inventor: David M. Gillies, Ontario, Canada

[73] Assignee: International Business Machines Corporation, Armonk, N.Y.

[21] Appl. No.: 598,065

[22] Filed: Feb. 7, 1996

Related U.S. Application Data

[63] Continuation of Ser. No. 247,432, May 23, 1994, abandoned.

[30] Foreign Application Priority Data

Oct. 29, 1993 [CA] Canada .................................. 2102089

[51] Int. Cl.$^6$ ...................................................... G06F 9/45
[52] U.S. Cl. ...................... 395/709; 395/707; 364/254.5; 364/265
[58] Field of Search ................................ 395/700, 709, 395/707

[56] References Cited

U.S. PATENT DOCUMENTS

| | | | |
|---|---|---|---|
| 5,301,325 | 4/1994 | Benson | 395/700 |
| 5,339,238 | 8/1994 | Benson | 395/700 |
| 5,339,428 | 8/1994 | Burmeister et al. | 395/700 |

OTHER PUBLICATIONS

O'Brien, et al., Advanced Compiler Technology for the RISC System/6000 Architecture, *IBM RISC System/6000 Technology*, IBM Corporation, 1990, pp. 154-161.

Gilbert, K.M., Effective Register Management During Code Generation, *IBM Technical Disclosure Bulletin*, vol. 15, No. 8, Jan. 1973, pp. 2640-2645.

*Primary Examiner*—Kevin A. Kriess
*Assistant Examiner*—Majid A. Banankhah
*Attorney, Agent, or Firm*—Edward H. Duffield; Andrew J. Dillon

[57] ABSTRACT

An optimizing compiler for producing executable programs from code, high level languages compiles the code whilst generating data from which a callgraph may be constructed, and then recompiles the procedures identified in the callgraph in an order which reverses the topology of the callgraph while monitoring usage of hardware registers. Procedures which are rarely or never called, or result in termination of the program, are identified, and are modified if needed so that if called, registers which they may modify are saved prior to execution of the procedure and subsequently restored if necessary, so that in a calling procedure, subsequently recompiled, no account need be taken of possible register usage by the called procedure. This makes additional registers available to the calling procedure, and enables register storing and restoring which must otherwise be associated with the callsite to be eliminated.

16 Claims, 3 Drawing Sheets

SYSTEM AND METHOD FOR RECOMPILING COMPUTER PROGRAMS FOR ENHANCED OPTIMIZATION

This is a continuation of application Ser. No. 08/247,432, filed May 23, 1994, now abandoned.

BACKGROUND OF THE INVENTION

1. Technical Field

This invention relates to the compiling of source code of computer programs written in high level languages in order to generate object code suitable for execution on a target computer, and more particularly to the optimization of such code using a recompilation technique to provide maximum efficiency in both execution and compilation.

2. Description of the Related Art

High level language statements are translated during compilation into procedures capable of implementing the statement, but since these procedures must be capable of functioning in any environment in which this language statement may occur, the code produced tends to include a high degree of redundancy and compromise unless subject to optimization. The term procedure as used in this specification should be regarded as including routines and functions which will result in a procedure call from a call site when compiled.

Optimization is a generic term utilized for modifications applied to source code, object code, or any intermediate code featuring in a compilation, in order to increase the efficiency of the compiling process. Efficiency in this context may refer to improving the speed of execution of the final object code, reducing object code size or improving compilation speed to improve productivity during program development, bearing in mind that repeated recompilations will gradually be necessary during such development.

Optimization may take place at various stages during the compilation process, but techniques fall broadly into two categories—front end, during which the source or intermediate code is modified so as to eliminate redundancies and unused code, and so as to favour the generation of more efficient object code, and back end, in which object code generated is modified, usually in the latter case to improve execution speed.

Central processing units utilized in general purpose programmable computers make extensive use of hardware registers to hold data items utilized during program execution, thus avoiding the overhead associated with memory references. Effective management of such registers forms a major aspect of compiler optimization, although the number, size and restrictions of use of such registers may vary widely from processor to processor. Some general principles relating to such management are discussed in an article "Effective Register Management During Code Generation", K. M. Gilbert, IBMS Technical Disclosure Bulletin, January 1973, pages 2640 to 2645. Optimization techniques in compilers for reduced instruction set (RISC) computers are discussed in an article "Advanced Compiler Technology for the RISC System/6000° Architecture", by O'Brien et al, at pages 154–161 of IBM RISC System/6000 Technology, published 1990 by IBM Corporation. Both of these documents emphasize the importance of efficient hardware register usage.

Only a limited number of registers is usually available for general purpose usage in typical processors, and a compiler must typically make pessimistic assumptions as to the possibility of these registers being modified by any procedure referenced during compilation. According to the nature of the compiler and/or processor, certain registers may be generically identified as modifiable by procedures or "volatile". In IBM's RISC System 6000 target processor, many of the registers are volatile: of condition registers 0 to 7, 2 through 4 are volatile; of general purpose registers 0 to 31, and 0 and 3 through 12 are volatile; and of floating point registers 0 to 31, 0 through 13 are volatile. Individual procedures may be characterized by all or some lesser number of registers being subject to modification, although in the context in which a procedure is called the actual number of registers subject to modification may be smaller. This last information has to date been of little use in a loop involving multiple procedures. Entry to a procedure normally entails saving the content of all registers subject to modification by that procedure or any other procedures called by it, which imposes considerable overhead both in terms of the machine cycles required to implement the save (and subsequent restore) operations, and in stack usage.

SUMMARY OF THE INVENTION

It is an object of the present invention to provide a back-end optimization technique both for reducing this undesirable overhead, and improving the efficiency, in terms of compilation time with which other techniques may be applied by reducing the amount of code to be processed by such techniques.

The invention provides a method of compiling a computer program written in a high level language to provide a program executable upon a target computer comprising precompiling the program, collecting callgraph data concerning the procedures it contains and the sites from which these procedures are called, identifying target procedures which are rarely or never called during normal execution or which do not return from a call, and recompiling the program to provide the executable program, in reverse topological order to that indicated by the callgraph data, including any necessary code in target procedures such that register usage by such procedures can be and is ignored during recompilation a non-target procedure calling a target procedure.

The invention extends to a method of compiling a computer program from code modules of a high or intermediate level language, to provide object code executable on a target computer having hardware registers available for the storage of data used by the program during execution.

First, the method compiles the code modules and then processes data. The data is produced during at least one of compiling of the code modules and execution of an executable program produced by linking of the modules. The data is used to produce a call graph of procedures comprised by the program, and to identify target procedures in the category of at least one of procedures rarely or never called during normal execution of the program and procedures which never return from a call. Next, the method recompiles the procedures, which are recompilations of identified target procedures being with the inclusion of code at the entry of the procedure, to save all hardware registers modifiable thereby, and with the inclusion of code to restore the saved registers if the procedure returns, whereby said target procedures may be considered in compiling of procedures containing their callsites to use no hardware registers.

The invention also extends to apparatus for compiling computer programs to convert modular source code into object code executable upon a target computer, by a method according to the invention. which apparatus may contain a general purpose computer configured to carry out the method by the loading of a compiler program implementing the invention. The invention further extends to media recorded with a compiler program for so configuring a general purpose computer.

Unlike conventional optimization techniques, which are typically intraprocedural, implementation of the present invention is dependent upon the relationships between procedures; thus a rarely or once used procedure is modified in a manner which reduces its performance in order to improve the performance of another procedure, more frequently used calling the modified procedure. To the extent that these interprocedural relationships must be analyzed in order to apply the invention, it is useful and convenient to apply the invention in conjunction with other optimization techniques which can utilize such an analysis, and the nature of the analysis may take this into account, as in the following example: however such other optimization techniques do not form part of the present invention.

The invention is further described with reference to the following description of an exemplary compiler incorporating the invention.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

In order to implement the present invention, a program must be compiled twice, first to provide information upon interprocedural relationships, and secondly to apply the information gathered.

Figure 1:
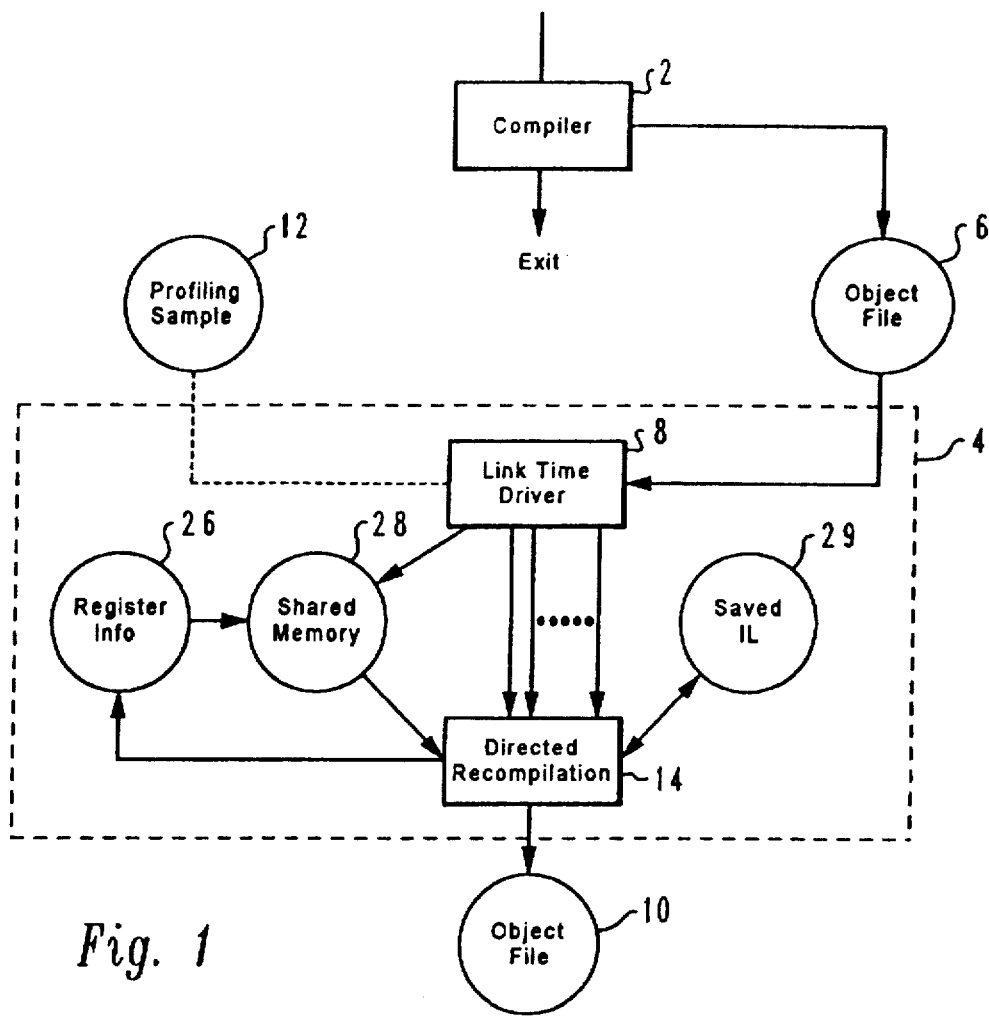
FIG. 1 is a block diagram of the structure of relevant portions of a compiler implementing the invention.

The system incorporated in the compiler of FIG. 1 is thus a two-pass system. The first pass, which is performed at compile time, collects summary information for each procedure compiled. The second pass, which is performed at link time, merges the collected information and uses it to compute an interprocedural solution for the entire application. The application is then rebuilt using the interprocedural solution to enhance optimization. In the example shown, a command option to a compiler 2, upon its invocation to compile source code modules, causes it to collect interprocedural information about procedures which it compiles. A command option to a compiler loop module 4 (or a Linker could be used) upon its invocation to link object code produced by the compiler causes the loop module to use the interprocedural information to recompile the modules with enhanced optimization, and link the interprocedurally optimized versions of object code to form a "golden" output file 10.

Information collection during compilation is triggered by the use of the designated command option. Summary information for the file and each procedure is collected during compilation and is written to the object file 6. Each object file 6 is associated with an appropriately identified section containing the additional information. This information could of course be collected in a separate file if more convenient.

This summary information includes:

The fully qualified source file name.

The name of each contained procedure (with sufficient information to avoid ambiguity).

The compiler options invoked.

A list of all callsites in each procedure, again with sufficient information to avoid any ambiguity in identification.

Constant propagation information for parameters at each callsite.

Alias information for each procedure.

Information as to suitability for other optimization techniques, i.e. inlining and cloning, such as intermediate language size, automatic storage usage, and constant parameters, for each procedure.

Callsite post-dominance information.

A measure of code motion out of loops as computed by the Morel-Reinvest and the common subexpressions algorithms.

Register pressure/coloring (usage) information.

When all files in the application have been compiled, the user invokes the compiler loop module 4 through the compiler, again with the command option mentioned above. The link time driver 8 reads the summary information from the object files 6 and, optionally, from a profiling sample 12 produced by running a profiler on an output file produced by a previous linking of the object file 6, and computes the application's callgraph utilizing known callgraphing techniques.

For example, consider the application shown below:

| File a.c: | File b.c: |
|---|---|
| main() | bar() |
| { | { |
| ... | ... |
| foo(); | foobar(); |
| bar(); | } |
| } | File c.: |
| foobar0 | foo() |
| { | { |
| ... | ... |
| foo(); | } |
| ... | |
| } | |

Figure 2:
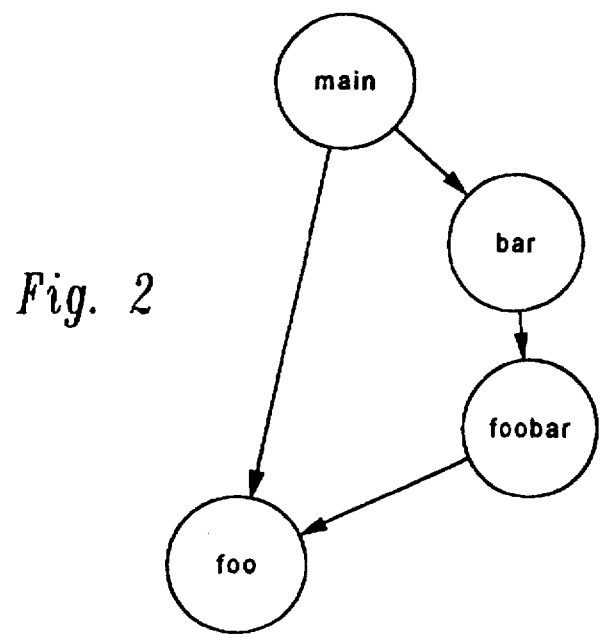
FIG. 2 depicts a graphical representation of the call graph of a simple program.

FIG. 2 shows the callgraph for this example. Information that will allow the driver 8 to construct the application's callgraph is contained in each of the three object files. For enhanced optimization in the invention, the driver causes a bottom-up (reverse topological ordered) recompilation 14 of the application. In our example the ordering is a.c(foo), c.c(foobar), b.c(bar) and a.c(main). The optimizer is repetitively invoked, by the driver program, in this order once the interprocedural solution for the entire application has been computed.

The interprocedural solution is computed in several steps:

Alias information for each procedure is propagated upwards in the callgraph to the root.

Constant parameter information is propagated downwards in the callgraph to the leaves.

Figure 3:
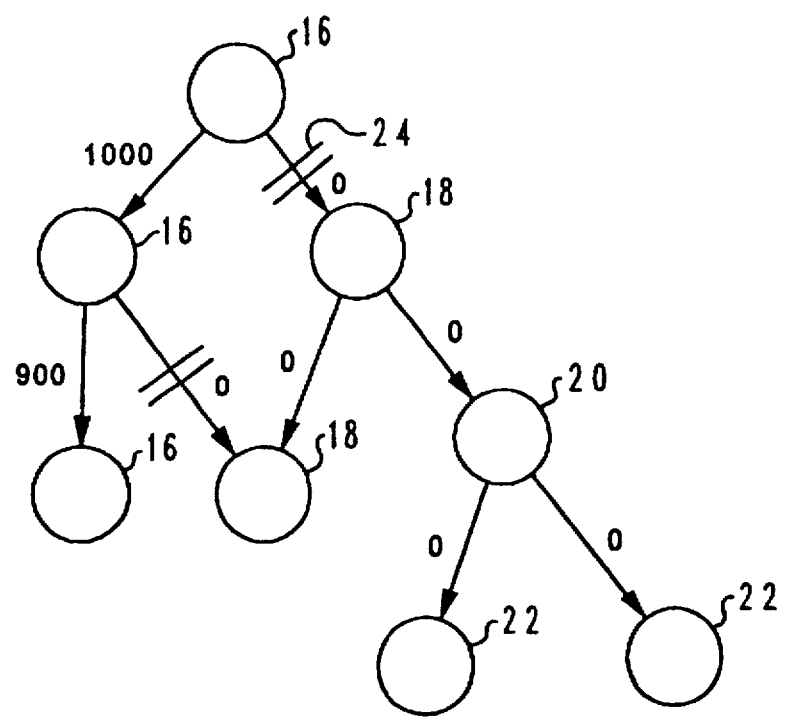
FIG. 3 is graphical illustration of the operation of the present information applied to a callgraph.

Profile information, if available, is read and callgraph edges are marked with traversal counts (see FIG. 3).

Heuristic algorithms are run to identify candidates for various optimization techniques, including that of the invention.

As each procedure in the application is recompiled, register usage information is saved and fed back into subsequent recompilations. It is useful for compilers designed for a particular hardware platform to respect conventions as to which available hardware registers may be modified by procedures as compiled. For example, in the RISC System/6000 target processor, linkage convention dictates that general purpose registers 9.1, and 3-12, floating-point registers 0-13, condition registers 9, 1, 5, 6, and 7, and the count register are volatile. In the absence of information to the contrary, the caller must assume that the values contained in volatile registers are killed by the callee.

Returning to FIG. 1, the compiler recompiles the application at link time in reverse topological callgraph order. Hence callee procedures will be recompiled before their callers. By storing register information 26 about actual register usage in the callee in shared memory 28, the unaltered volatile registers are still available for use by the caller. This process may be referred to as register resurrection. Register resurrection permits an application to make better use of the available hardware register file. The application should experience less storage traffic caused by reduced register save/restore code and reduced register spill code, that is traffic to and from the stack due to insufficient hardware registers being available to service a procedure.

Even when analysis determines that a reference to a procedure may invalidate the register's contents, there may be a benefit to moving the register save-and-restore code that would otherwise be required in the calling procedure. This technique is beneficial where the procedure is known to be referenced only very rarely, such as debugging and error handling procedures. For example:

Preserve.f
DO I=1,00000
C . . . Code that manipulates may scalars or arrays
    IF (X1(I).GT.1.OE32) CALL ERROR1Q(X1(I))
    IF (x1(I)..LT.0.1E-32) CALL ERROR2(X1)(I))
C . . . Code that does some more with these scalars or
    arrays ENDDO Without modification of the called procedures, the compiler assumes that linkage-convention volatile registers are invalidated by the references to ERROR1 and ERROR2, and so additional code may be generated to restore any values that were in registers before the references and that are required after the references. This additional code can reduce performance and increase the code size of the loop, which can increase instruction cache miss delays. However, if ERROR1 and ERROR2 are almost never called, the code to save and restore invalidated registers can be transferred into the procedures so that there is no need to reload the values within the referencing procedure. This is done by placing register saving code at the start of each procedure, and placing register restoring code at the end of the procedure.

Even though this may result in a larger object file, instruction cache and processor usage are improved because the register-preserving code is almost never loaded into the instruction cache and is almost never executed.

Moving register save-and-restore code is useful for error-handling or range-checking procedures where the error or out-of-range value is found only rarely.

If a referenced procedure always terminates a program, there is no reason to invalidate registers when the procedure is referenced. In the following C example, the standard function exit( ) is called within a conditional block. Normally, the compiler inserts code before and possibly after the call to exito to save and restore any required registers that may be invalidated by the call.

```
int main(void) {
/* . . . */
for (i=0;i<10000;i++) {
    if (a[i]>10000.0)
        bailout(-1);
    else
        a[i]+=b[i]*c[i]
    }
/* . . . */
}
int bailout(int retcode) {
    printf("Error: %5 ", msg [-retcode]);
    exit(retcode);
}
```

The compiler does not know that exit( ) is a function that never returns, and that preserving the registers across the reference to bailout( ) is therefore pointless. This is also true for the C functions abort( ) and terminate( ) or asserts( ) in the RISC System 6000 target environment, the Fortran STOP statement, and other terminating procedures. The linker can be instructed to treat certain standard procedures as terminating procedures, by specifying an exits suboption. This suboption does not allow terminating procedures. However, the callgraph can establish that a procedure always calls a terminating procedure, and can propagate this information upwards in the calling chain so that registers are not preserved around references to terminating procedures, upon call of which the preservation of registering becomes immaterial.

However, the most beneficial application of the invention is in conjunction with profiling data feedback. Functions that are never called in a profiling sample 12 will be modified as described above, as may other functions that are called with less than a predetermined frequency. The profiling information may be collected from a single run, or the user may collect information from several typical runs. In any event, the sample obtained is considered to be representative of the running application and procedures for modification are selected accordingly. As seen in FIG. 3, the inclusion of profiling information in the callgraph enables procedures at boundaries between frequently called procedures 16 and rarely or never called procedures 18, 20, 22 to be modified as described above. It should be noted that application of the invention is only needed at the points where a frequently executed procedure calls an infrequently called procedure, since inherently the infrequently called procedure can only itself make infrequent calls.

Other optimization techniques benefit from the above use of profiling information, such as inlining and cloning. There is no benefit in inlining or cloning never called or infrequently called procedures. This allows more aggressive inlining or cloning of more highly used routines since concerns about code-size explosions caused by over-inlining will not become a factor as quickly. FIG. 3 shows a generic callgraph whose edges are labelled, via profiling feedback, with the frequency they are traversed. With this information, modification of the routines 18 and 20 isolates the entire subtree below the "firewalls" 24 erected by such modification, which ensures that register usage by the producers 18, 20 and 22 is invisible to the procedures 16; this same information indicates that there is no benefit in applying inlining or cloning techniques to the call beyond the firewalls.

Figure 4:
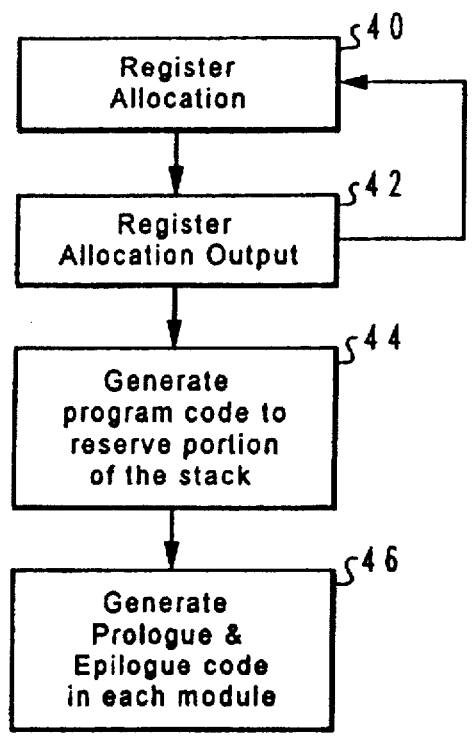
FIG. 4 depicts a flow diagram illustrating the computer-implemented steps for practicing a method of the invention.

Once it has been determined necessary to construct a "firewall" in a code module, the generation steps set out in the schematic flow diagram of FIG. 4 are followed.

Register allocation 40 is accomplished by passing the program code through a register allocation algorithm to compute the solutions for each disjoint class of registers on the target computer. A suitable register allocation algorithm is described, for example in an article: "Register Allocation and Spilling Via Graph Coloring:. by Chaitin et al. in Computer Language, 6:47–57, 1981.

The register allocation 40 yields the register allocation output 42 for each register class.

Multiple passes of the register allocation loop 40, 42 may be necessary to compute and allocate the solutions for all the register classes for the target machine. For example, in the RISC System/6000 target environment, there are three classes of registers, so that three passes of the register allocation algorithm are required.

Following the register allocation for all classes of registers, code is generated in the prologue of the program 44 to reserve a portion of the automatic stack storage to hold all of the modified volatile registers. This stack storage is of course allocated at runtime.

Then, for each modified register, code is generated in each module 46 as follows: code is generated in the prologue to implement a store of the proper width into the next available slot in the reserved storage, and is generated in the epilogue to implement a load of the proper width from the same slot in the reserved storage back into the same volatile register.

Figure 5:
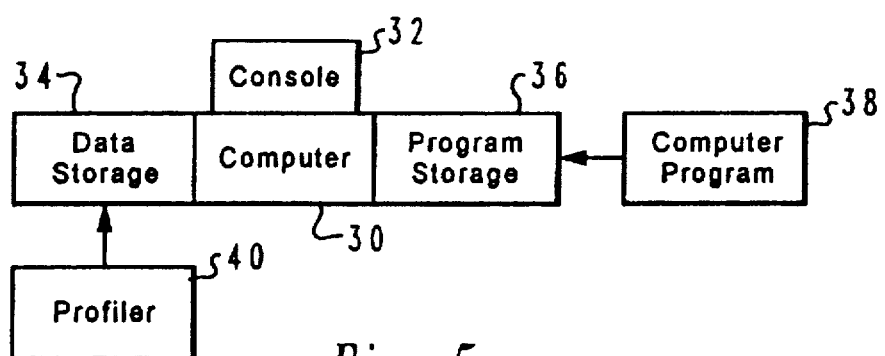
FIG. 5 is a block diagram of an apparatus used to implement the invention.

Each generated module in a computer program then includes:
  Prologue Code
  Main code for module
  Epilogue Code Referring to FIG. 5, the compiling method of the invention may be implemented utilizing a general purpose computer 30, which may be similar or dissimilar to the target computer of the compilation depending on whether a regular or cross-compiler is being implemented. The computer has a conventional console 32 providing a user interface, and conventional storage for both data 34 and programs 36. A program 38 stored on suitable media is loaded into the computer's program storage to configure it as compiling apparatus. The data storage 34 may receive data input from a profiler 40 which may be implemented either utilizing the same computer or separately.

It should be understood that the compiler may accept as input either a conventional high level language, or an intermediate language to which the high level language has already been translated; the latter may be advantageous in that it permits many of the programs making up a compiler suite to be common to several different languages, which are translated to a common intermediate language by appropriate front end modules.

While the invention has been particularly shown and described with reference to a preferred embodiment, it will be understood by those skilled in the art that various changes in form and detail may be made therein without departing from the spirit and scope of the invention.

What is claimed is:

1. A method for optimizing the compilation of a computer program written in a high level language to allow said computer program to be executable upon a target computer, comprising the steps of:
  precompiling said computer program, which further comprises the steps of:
  collecting call graph data concerning procedures performed by said computer program and sites from whence said procedures are called;
  identifying target procedure that have a low-priority during normal execution of said computer program; and
  recompiling said computer program to provide an executable program further comprising the step of:
  controlling register usage by said target procedures during recompilation by preserving registers for said non-target procedures so as to avoid conflict with any non-target procedure when said target procedure is called during execution of said computer program.

2. The method according to claim 1 wherein said low-priority target procedures are those procedures rarely called during normal execution of said computer program.

3. The method according to claim 1 wherein said low-priority target procedures include those target procedures that are never called during normal execution of said computer program, but are called during precompiling said program.

4. The method according to claim 1 wherein said low-priority target procedures are those that do not return from a call during normal execution of said computer program or during said precompiling of said program.

5. The method, according to claim 1, wherein said step of recompiling said program is performed in reverse topological order to that indicated by the callgraph data.

6. The method according to claim 1, further including the step of applying additional optimization techniques to that portion of the program formed by non-target procedures.

7. A method of compiling a computer program from a plurality of code modules of a high or intermediate level language, to provide object code executable on a target computer having hardware registers available for storage of data used by said computer program during execution, comprising the steps of:
  compiling each of said plurality of code modules;
  processing data from at least one of said compiled code modules and from an executable program produced by linking said code modules one to another;
  producing a callgraph of procedures, based on said processed data, that are possible within said computer program;
  identifying said target procedures within a first group of procedures having a low-priority of being called by said computer program during normal execution; and
  recompiling said procedures and said target procedures having low priority so as to save all hardware registers modified by said low-priority target procedures;
  preserving selected registers for said non-target procedures; and
  restoring said saved registers upon exit from said low-priority target procedures during execution of said computer program.

8. The method according to claim 7 wherein said step of recompiling said procedures further comprises the step of coding said low-priority target procedures during said step of compiling of said procedures so that any call sites requested by said low-priority target procedures use no hardware registers.

9. The method, according to claim 7, wherein said low-priority target procedures include procedures whose call results in an exit from said computer program.

10. The method, according to claim 7, wherein said processed data includes data generated by running a profiler on an executable program produced by linking compiled modules, and said low-priority target procedures includes procedures identified by the profiler as rarely, if ever, called.

11. The method, according to claim 7, wherein the introduction of register saving and restoring code into a target procedure is performed by adding prologue and epilogue code to the code of the original procedure including the register saving and restoring code.

12. The method, according to claim 7, wherein the procedures are recompiled in reverse order to that in which they are called as shown in said means for recompiling said procedures in an order reversing topology defined by the callgraph data while storing in data memory storage details of hardware register usage; and means for linking the recompiled source code modules into an executable program.

13. In an apparatus for compiling a computer program from a plurality of source code modules in a computer language to produce an executable program, comprising a programmable computer having a user interface, and data and program storage, the program storage holding a compiler program suite for execution on the computer, the compiler program suite comprising:

a compiler program module for compiling said plurality of source code modules and configuring said computer to generate data relating to each of said plurality of source code modules compiled including data identifying each procedure therein, callsites within each procedures, and register usage by code procedure;

a compiler loop module comprising:

means for accepting the data generated by the compiler program module to construct callgraph data;

means for modifying procedures contained in said plurality of source code modules comprising:

means for permitting identification of target procedures that will rarely or never be used during normal execution of the executable program;

means for modifying returning procedures by the insertion of code that saves and restores registers that may be modified by the target procedures;

means for recompiling said procedures in an order reversing topology defined by the callgraph data while storing in data memory storage details of hardware register usage whereby said recompiled procedure containing a callsite of a modified procedure may be recompiled without regard for hardware register modifications by the called procedure; and means for linking the recompiled source code modules into an executable program.

14. The apparatus according to claim 13 wherein said means for recompiling the procedures contained in the source code modules is adapted to recompile those procedures in an order reversing topography defined by the callgraph data.

15. The apparatus according to claim 13, wherein said means for permitting identification of target procedures includes a profiler.

16. The apparatus according to claim 13, wherein said means for permitting identification of target procedures includes means for recognizing procedures that lead only to termination of the program.

* * * * *

UNITED STATES PATENT AND TRADEMARK OFFICE
CERTIFICATE OF CORRECTION

PATENT NO. : 5,768,595
DATED : June 16, 1998
INVENTOR(S) : *David M. Gillies*

It is certified that error appears in the above-identified patent and that said Letters Patent is hereby corrected as shown below:

In col. 5, line 47, please delete "IF (X1(I).GT.1.0E32) CALL ERROR1Q(X1(I))" and insert --IF (X1(I).GT.1.0E32) CALL ERROR1(X1(I))--.

In col. 5, line 48, please delete "IF (x1(I)..LT.O.1E-32) CALL ERROR2(X1)(I))" and insert --IF (x1(I).LT.0.1E-32) CALL ERROR2(X1(I))--.

In col. 6, line 11, please delete "exito" and insert --exit()--.

In col. 6, line 23, please delete "printf(Error: %5 ",msg [-retcode]);" and insert --printf("Error: %5\n",msg[-retcode]);--

Please delete Claim 12 and substitute the following:

--12. The method, according to claim 7, wherein the procedures are recompiled in reverse order to that in which they are called as shown in said callgraph, and recompilation of target procedures precedes recompilation of procedures containing call sites for said target procedures.--

Signed and Sealed this

Ninth Day of February, 1999

Attest:

*Acting Commissioner of Patents and Trademarks*

*Attesting Officer*